United States Patent Office 3,096,329
Patented July 2, 1963

3,096,329
TRIAZOLO[b]PYRIDAZINES
Edgar Alfred Steck, Guilderland Township, Albany County, N.Y., assignor to Sterling Drug Inc., New York, N.Y., a corporation of Delaware
No Drawing. Filed Oct. 15, 1957, Ser. No. 690,195
12 Claims. (Cl. 260—250)

This invention relates to triazolo[b]pyridazines.

The present invention resides in the concept of a composition of matter having a molecular structure wherein a tertiary-aminoalkylene radical is attached through an imino bridge to the carbon atom in the 8-position of an s-triazolo[b]pyridazine radical. This idea has been applied in actual practice and its utility demonstrated by the embodiment in tangible form of several representative species of the generic concept constituting the claimed invention. The identifying physical characteristics of several compounds embodying the invention have been ascertained and proof of molecular structure has been accomplished. The physical embodiments of the inventive concept herein described and claimed are useful as sedatives, ganglionic blocking agents and anticholinesterase agents.

The tertiary-aminoalkylene radicals contemplated here are constituted by a well-known group of organic radicals in which: (a) two of the substituents attached to the amino nitrogen are lower-alkyl radicals, either straight or branched chain, and these may, as is also known, be joined to form, with the amino nitrogen, a mono-heterocycle which can contain in the ring a second variant atom such as sulfur or oxygen; and, (b) the third substituent attached to the amino nitrogen is a lower-alkylene radical which may likewise be straight or branched in configuration and can be substituted with any of the usual groupings such as hydroxy and halo. The triazolo[b]pyridazine radical can bear substituents in the 6- and 7-positions of the known types such as lower-alkyl and monocarbocyclic aryl radicals. It will thus be apparent that the invention is in the getting of the concept of joining, through an imino bridge, of the alkylene substituent of a tertiary-aminoalkylene group with a triazolo[b]pyridazine in the 8-position.

The inventive concept can be embodied in physical form by the condensation of an 8-halo-s-triazolo[b]pyridazine with a tertiary-aminoalkylamine with the splitting out of hydrogen halide. The reaction is conducted at a temperature in the range between about 100° C. and about 250° C.

A particular aspect of the invention relates to compounds having the formula

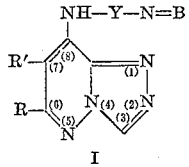

wherein R represents a lower-alkyl or a monocarbocyclic aryl radical, R' represents hydrogen or a lower-alkyl group, Y represents a lower-alkylene radical, hydroxy-substituted lower-alkylene radical or a monocarbocyclic aryl-substituted lower-alkylene radical in which the free valences are on different carbon atoms, and N=B represents a di-lower-alkylamino, 1-piperidyl, 1-pyrrolidyl, or 4-morpholinyl radical.

In the above general Formula I, R represents a lower-alkyl radical or a monocarbocyclic aryl radical. When R represents a lower-alkyl radical it can be straight or branched and contains from one to about eight carbon atoms, thus including such groups as methyl, ethyl, propyl, isopropyl, butyl, isobutyl, tertiary-butyl, pentyl, hexyl, isohexyl, heptyl, octyl, and the like. When R represents a monocarbocyclic aryl group it is a radical of the benzene series and can be an unsubstituted phenyl group or a phenyl group substituted by one or more substituents inert to the reaction conditions and reagents used in the process for preparing the compounds. Such inert substituents include lower-alkyl, lower-alkoxy, halogen, nitro, trifluoromethyl, and the like. A preferred class of R, when monocarbocyclic aryl, consists of phenyl and phenyl substituted by from one to three lower-alkyl, lower-alkoxy or halogen groups, and if two or more substituents are present they can be the same or different and in any of the various positions relative to one another. The lower-alkyl and lower-alkoxy groups preferably have from one to about four carbon atoms and thus can be methyl, ethyl, propyl, isopropyl, butyl, isobutyl, methoxy, ethoxy, propoxy, isopropoxy, butoxy, isobutoxy, etc. The halogen substituents may be any of the four halogens, fluorine, chlorine, bromine or iodine. Specific examples of the group R, when monocarbocyclic aryl, include phenyl, p-tolyl, p-ethylphenyl, m-butylphenyl, o-ethoxyphenyl, m-propoxyphenyl, p-butoxyphenyl, 3,4-dimethoxyphenyl, 2-methyl-4-methoxyphenyl, p-chlorophenyl, m-bromophenyl, 3-methoxy-4-chlorophenyl, p-fluorophenyl, and the like.

In the above general Formula I, R' represents a hydrogen atom or a lower-alkyl group. The lower-alkyl groups are of the same type as defined for the group R above.

In the above general Formula I, Y represents a lower-alkylene radical, a hydroxy-substituted lower-alkylene radical or a monocarbocyclic aryl-substituted lower-alkylene radical in which the free valences are on different carbon atoms. The aliphatic portion of the lower-alkylene or substituted lower-alkylene radicals contains from two to about six carbon atoms and may be straight or branched. The monocarbocyclic aryl groups, if present, are of the same type as those defined above for the group R. Illustrative of the groups which Y can represent are the following:

—CH$_2$CH$_2$—, —CH$_2$CH$_2$CH$_2$—, —CH$_2$CH(CH$_3$)—
—CH$_2$CH(OH)CH$_2$—, —CH$_2$CH$_2$CH$_2$CH$_2$—
—CH$_2$CH$_2$CH$_2$CH$_2$CH$_2$CH$_2$—, —CH$_2$CH(C$_6$H$_5$)CH$_2$—
—CH(CH$_3$)CH$_2$CH$_2$CH$_2$—
—CH$_2$CH(C$_6$H$_4$Cl-p)CH$_2$CH$_2$—
—CH$_2$CH(C$_6$H$_3$Cl$_2$—3,4)CH$_2$CH$_2$—
—CH$_2$CH(C$_6$H$_3$OCH$_3$—p)CH$_2$CH$_2$—
—CH$_2$CH(C$_6$H$_4$CH$_3$—p)CH$_2$CH$_2$—, and the like.

In the above general Formula I, the tertiary-amino radical N=B represents a di-lower-alkylamino or a saturated heterocyclic radical. In the di-lower-alkylamino radicals, the term lower-alkyl includes alkyl radicals containing from one to about six carbon atoms and the lower-alkyl groups can be the same or different. Thus N=B, when it represents a di-lower-alkylamino radical, includes such groups as dimethylamino, diethylamino, ethylmethylamino, dipropylamino, diisopropylamino, dibutylamino, dipentylamino, dihexylamino, and the like. N=B, when it represents a saturated heterocyclic group, includes such groups as 1-piperidyl, 1-pyrrolidyl, 4-morpholinyl and lower-alkylated derivatives thereof, for example, 2-methyl-1-piperidyl, 3-ethyl-4-morpholinyl, 2,5-dimethyl-1-pyrrolidyl, and the like.

The compounds of Formula I are prepared by the following series of reactions:

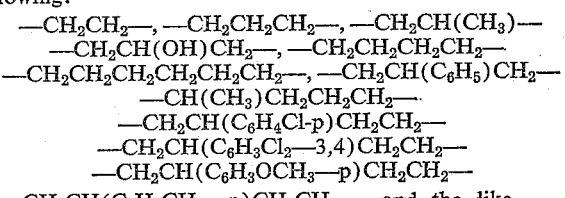

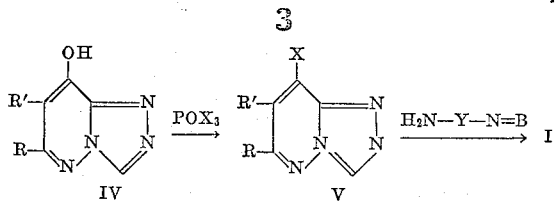

When a β-keto ester (II) is heated with 1-amino-1,2,4-triazole (III) there is obtained an 8-hydroxy-s-triazolo-[b]pyridazine (IV). The 8-hydroxy compound IV is then reacted with a phosphorus oxyhalide, $POX_3$, where X is a halogen, preferably chlorine or bromine, to give the 8-halo-s-triazolo[b]pyridazine (V). The compound of Formula V wherein X is iodine can be obtained by reacting the hydroxy compound IV with phosphorus and iodine. The compound V then is reacted with a tertiary-aminoalkylamino, $H_2N$—Y—N=B, to give the compound of Formula I. The condensation of V and $H_2N$—Y—N=B is carried out by heating the reactants together at a temperature between about 100° C. and about 250° C., optionally in the presence of various substances which serve as catalysts, for example phenols and alkali iodides. Since hydrogen halide is split out during the reaction there is produced in the reaction mixture some hydrohalide salt of the product I and/or of any excess $H_2N$—Y—N=B. In working up the reaction mixture it is preferred to neutralize all hydrohalide salts with an excess of a strong base and to remove the volatile materials, including excess $H_2N$—Y—N=B by steam distillation.

The structure of the compounds of the invention is established by the types of reactions employed in their preparation, by chemical analysis, and by the fact that the intermediates of Formula IV are a known class of compounds.

Acid-addition salts of the compounds of the above general Formula I are prepared either by dissolving the free base in an aqueous solution containing the appropriate acid and isolating the salt formed by evaporating the solution, or by reacting the free base and acid in an organic solvent, in which case the salt separates directly or can be obtained by concentration of the solution. Preferred types of acid-addition salts are those derived from mineral acids such as hydrochloric acid, hydrobromic acid, hydroiodic acid, nitric acid, sulfuric acid and phosphoric acid; and organic acids such as acetic acid, oxalic acid, citric acid, lactic acid, quinic acid, tartaric acid, and the like.

The quaternary ammonium salts of the above general Formula I are prepared by mixing the free base and the quaternizing agent, preferably in an organic solvent. Heating may be used to facilitate the reaction, although salt formation usually takes place readily at room temperature. The quaternary ammonium salt separates directly or can be obtained by concentration of the solution. Preferred types of quaternizing agents include alkyl, alkenyl or aralkyl esters of inorganic acids or organic sulfonic acids, thus including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

One quaternary ammonium salt can be converted to another in which the anion is different. If the anion of the quaternary salt forms a water-insoluble silver salt, which is usually the case, the quaternary salt can be reacted with silver oxide in aqueous medium to form a solution of the corresponding quaternary ammonium hydroxide. The latter can then be neutralized with any desired acid, weak or strong, to produce a new quaternary ammonium salt in which the anion is different from that of the original quaternary salt. In this way quaternary ammonium salts in which the anion is derived from a weak acid can be obtained.

Pharmacological evaluation of the compounds of the invention has demonstrated that the acid-addition salt forms of the compounds possess useful sedative effects in that they potentiate the sleeping time induced by administration of barbiturates. The quaternary ammonium salt forms of the compounds have been demonstrated to be useful as ganglionic blocking agents and anticholinesterase agents.

Preferred types of acid-addition and quaternary ammonium salts are those which are pharmacologically acceptable; that is, those whose anions are relatively innocuous to animal organisms in pharmacological doses of the salts. However, all salts, whether pharmacologically acceptable or not, are useful as intermediates in the preparation and purification of the free bases and as crystalline, characterizing derivatives.

The compounds of the invention can be prepared for use by dissolving a salt form of the compounds in water (or an equivalent amount of a non-toxic acid if the free base is used) under sterile conditions, or in a physiologically compatible aqueous medium such as saline, and stored in ampules for parenteral administration. Alternatively, they can be incorporated with excipients in tablet or capsule form for oral administration.

The following examples will further illustrate the invention without the latter being limited thereto.

EXAMPLE 1

(a) *6 - methyl - 8 -hydroxy - s - triazolo[b]pyridazine.*—A mixture of 245 g. of 4-amino-1,2,4-triazole and 500 cc. of ethyl acetoacetate was refluxed at 125–140° C. for nine hours, removing the ethyl alcohol formed by distillation at intervals of from one and one-half to two and one-half hours. During this time an additional 250 cc. of ethyl acetoacetate was added in portions. The reaction mixture was cooled to 80° C., 250 cc. of water was added and the solid material was collected by filtration. The latter was triturated with water, alcohol and ether, giving 316 g. of 6-methyl-8-hydroxy-s-triazolo[b]pyridazine, which was sufficiently pure to use in the succeeding reactions. The compound was further purified by recrystallization from acetic acid, giving colorless microcrystals, M.P. 304–306° C. (dec.) (corr.).

*Analysis.*—Calcd. for $C_6H_6N_4O$: C, 48.32; H, 3.38; N, 37.57. Found: C, 48.22; H, 3.90; N, 37.27.

(b) *6-methyl-8-chloro-s-triazolo[b]pyridazine.*—A mixture of 316 g. of 6-methyl-8-hydroxy-s-triazolo[b]pyridazine and 3 liters of phosphorus oxychloride was refluxed for five and one-half hours. Most of the excess phosphorus oxychloride was then removed at reduced pressure (water pump), and the residue was poured into ice and made basic with ammonium hydroxide. The solid material was collected by filtration and recrystallized twice from water (about 4 liters) using activated charcoal for decolorizing purposes. There was thus obtained 227 g. of 6-methyl-8-chloro-s-triazolo[b]pyridazine in the form of colorless needles, M.P. 190–190.5° C. (uncorr.). Further product was obtained by extraction of the combined aqueous mother liquors with methylene dichloride, and concentration of the extracts.

*Analysis.*—Calcd. for $C_6H_5ClN_4$: C, 42.74; H, 2.99; Cl, 21.03. Found: C, 42.43; H, 3.32; Cl, 21.20.

Replacement of the phosphorus oxychloride in the preceding preparation by a molar equivalent amount of phosphorus oxybromide or of phosphorus and iodine, yields, respectively, 6-methyl-8-bromo-s-triazolo[b]pyridazine or 6-methyl-8-iodo-s-triazolo[b]pyridazine.

(c) *6 - methyl - 8 - (3 - diethylaminopropylamino)-s-triazolo[b]pyridazine.*—A mixture of 16.8 g. of 6-methyl-8-chloro-s-triazolo[b]pyridazine and 25 g. of phenol was heated to 90–110° C. There was then added 26 g. of 3-diethylaminopropylamine in four portions over a period of about one-half hour. A trace of potassium iodide was added and the reaction mixture was heated at 160–170° C.

for seventeen hours. After cooling, the reaction mixture was poured into ice and excess sodium hydroxide and extracted with methylene dichloride. The methylene dichloride extracts were concentrated to a small volume and steam distilled until 400 cc. of distillate was collected. The undistilled residue was extracted with methylene dichloride, and the extracts were dried over anhydrous sodium sulfate and concentrated to dryness. The residue (26.1 g.) was dissolved in 500 cc. of boiling petroleum ether (Skellysolve B), and the supernatant solution was decanted from an insoluble dark tar and cooled in an ice-salt bath. There separated 18.3 g. of 6-methyl-8-(3-diethylaminopropylamino)-s-triazolo[b]pyridazine, M.P. 92–96° C. A recrystallization from petroleum ether gave a cream-colored solid with the M.P. 94.5–97° C. (corr.).

Analysis.—Calcd. for $C_{13}H_{22}N_6$: C, 59.51; H, 8.45; N, 32.04. Found: C, 59.54; H, 8.36; N, 32.31.

A 0.5% solution of 6-methyl-8-(3-diethylaminopropylamino)-s-triazolo[b]pyridazine in dilute acetic acid administered subcutaneously to mice at a dose level of 50 mg./kg. of body weight forty-five minutes before an interperitoneal dose of hexobarbital sodium caused a 69% increase in sleeping time. The acute toxicity (approximate lethal dose, $ALD_{50}$) of 6-methyl-8-(3-diethylaminopropylamino)-s-triazolo[b]pyridazine, administered interperitoneally to mice, was 210 mg./kg.

In the procedure just described the 6-methyl-8-chloro-s-triazolo[b]pyridazine can be replaced by molar equivalent amounts of either 6-methyl-8-bromo-s-triazolo[b]pyridazine or 6-methyl-8-iodo-s-triazolo[b]pyridazine.

Replacement of the 3-diethylaminopropylamino in the procedure just described by molar equivalent amounts of 2-(1-pyrrolidyl)ethylamine, 2-(1-piperidyl)ethylamine, 2-(4-morpholinyl)ethylamine, or 2-(2-methyl-1-pyrrolidyl)-ethylamine, yields, respectively, 6-methyl-8-[2-(1-pyrrolidyl)ethylamino]-s-triazolo[b]pyridazine, 6-methyl-8-[2-(1-piperidyl)ethylamino]-s-triazolo[b]pyridazine, 6-methyl - 8 - [2 - (4 - morpholinyl)ethylamino] - s - triazolo[b]pyridazine, or 6-methyl-8-[2-(2-methyl-1-pyrrolidyl)ethylamino]-s-triazolo[b]pyridazine.

A portion of the 6-methyl-8-(3-diethylaminopropylamino)-s-triazolo[b]pyridazine was converted to its oxalate salt by treating an ethyl acetate solution of the free base with an excess of oxalic acid. The salt which separated was recrystallized from aqueous ethanol by first dissolving in water and then adding ethanol. The oxalate was obtained in the form of colorless blades, M.P. 210.5–212.5° C. (dec.) (corr.).

Analysis.—Calcd. for $C_{13}H_{22}N_6 \cdot C_2H_2O_4$: C, 51.12; H, 6.86; N, 23.85. Found: C, 51.40; H, 6.88; N, 24.10.

6 - methyl - 8 - (3 - diethylaminopropylamino) - s - triazolo[b]pyridazine was converted to its methiodide salt by warming a methanol solution of the free base with an excess of methyl iodide. The methiodide salt was caused to precipitate by addition of ether. After two recrystallizations from a methanol-ether mixture, the methiodide salt was obtained in the form of colorless needles, M.P. 204.5–207° C. (corr.).

Analysis.—Calcd. for $C_{14}H_{25}IN_6$: N, 20.79; I, 31.39. Found: N, 20.99; I, 31.28.

The methiodide salt of 6-methyl-8-(3-diethylaminopropylamino)-s-triazolo[b]pyridazine when tested by the bilateral carotid occlusion method in barbitalized dogs showed a ganglionic blocking activity against both parasympathetic and sympathetic ganglia equal to that of tetraethylammonium bromide. The quaternary ammonium salt also showed an anticholinesterase activity 6% that of neostigmine methylsulfate as measured by the electrometric method for the determination of red blood cell and plasma cholinesterase activity [Michel, J. Lab. Clin. Med. 34, 1564 (1949)].

EXAMPLE 2

6 - methyl - 8 - (4 - diethylamino - 1 - methylbutylamino)-s-triazolo[b]pyridazine was prepared in 71% yield by reacting 6-methyl-8-chloro-s-triazolo[b]pyridazine and 4-diethylamino-1-methylbutylamine according to the manipulative procedure described above in Example 1, part (c). The free base was obtained in the form of a yellow oil, B.P. about 200° C. (0.06 mm.).

Analysis.—Calcd. for $C_{15}H_{26}N_6$: N (basic), 9.65. Found: N (basic), 9.60.

The oxalate salt of 6-methyl-8-(4-diethylamino-1-methylbutylamino)-s-triazolo[b]pyridazine was obtained from the free base in 74.5% yield in the form of colorless spherules, M.P. 217.5–218.5° C. (corr.), when recrystallized from ethanol.

Analysis.—Calcd. for $C_{15}H_{26}N_6 \cdot C_2H_2O_4$: C, 53.66; H, 7.42; N, 22.09. Found: C, 53.75; H, 7.21; N, 21.92.

EXAMPLE 3

6 - methyl - 8 - (3 - diethylamino - 2 - hydroxypropylamino)-s-triazolo[b]pyridazine was obtained in 81% yield by reacting 6-methyl-8-chloro-s-triazolo[b]pyridazine and 3-diethylamino-2-hydroxypropylamine according to the manipulative procedure described above in Example 1, part (c). The free base was obtained in the form of colorless platelets, M.P. 126–127° C., when recrystallized from heptane.

Analysis.—Calcd. for $C_{13}H_{22}N_6O$: C, 56.09; H, 7.97; N, 30.19. Found: C, 55.90; H, 7.67; N, 30.20.

The oxalate salt of 6-methyl-8-(3-diethylamino-2-hydroxypropylamino)-s-triazolo[b]pyridazine was obtained from the free base in 68% yield in the form of colorless microcrystals, M.P. 167.5–170° C. (dec.) (corr.), when recrystallized from ethanol.

Analysis.—Calcd. for $C_{13}H_{22}N_6O \cdot C_2H_2O_4$: C, 48.90; H, 6.57; N, 22.82. Found: C, 49.13; H, 6.75; N, 23.21.

EXAMPLE 4

6-methyl-8-(2 - diethylaminoethylamino)-s-triazolo[b]pyridazine was prepared in 88% yield by reacting 6-methyl-8-chloro-s-triazolo[b]pyridazine and 2 - diethylaminoethylamine according to the manipulative procedure described above in Example 1, part (c). The free base was obtained in the form of colorless leaflets, M.P. 151.5–152.5° C., when recrystallized from heptane.

Analysis.—Calcd. for $C_{12}H_{20}N_6$: C, 58.04; H, 8.12; N, 33.85. Found: C, 58.15; H, 7.94; N, 34.15.

The oxalate salt of 6-methyl-8-(2-diethylaminoethylamino)-s-triazolo[b]pyridazine was obtained from the free base in 71% yield in the form of colorless microcrystals, M.P. 173–174° C. (dec.) (corr.), when recrystallized from ethanol.

Analysis.—Calcd. for $C_{12}H_{20}N_6 \cdot C_2H_2O_4$: C, 49.69; H, 6.56; N, 24.84. Found: C, 49.73; H, 6.57; N, 25.08.

EXAMPLE 5

6-methyl-8-(4 - diethylaminobutylamino)-s-triazolo[b]pyridazine was prepared in 77% yield by reacting 6-methyl-8-chloro-s-triazolo[b]pyridazine and 4-diethylaminobutylamine according to the manipulative procedure described above in Example 1, part (c). The free base was obtained in the form of colorless microcrystals, M.P. 81–81.5° C., when recrystallized from hexane.

Analysis.—Calcd. for $C_{14}H_{24}N_6$: C, 60.84; H, 8.75; N, 30.41. Found: C, 60.52; H, 9.01; N, 30.19.

The oxalate salt of 6-methyl-8-(4-diethylaminobutylamino)-s-triazolo[b]pyridazine was obtained from the free base in 64% yield in the form of colorless flakes, M.P. 144.5–146.5° C. (corr.), when recrystallized from aqueous ethanol.

EXAMPLE 6

6-methyl-8-(4 - dibutylaminobutylamino)-s-triazolo[b]pyridazine was prepared in 59% yield by reacting 6-methyl-8-chloro-s-triazolo[b]pyridazine and 4-dibutylaminobutylamine according to the manipulative procedure described above in Example 1, part (c). The free base was obtained in the form of colorless platelets, M.P. 76–77° C., when recrystallized from hexane.

*Analysis.*—Calcd. for $C_{18}H_{36}N_6$: C, 65.02; H, 9.70; N, 25.28. Found: C, 64.98; H, 9.82; N, 25.12.

The oxalate salt of 6-methyl-8-(4-dibutylaminobutylamino)-s-triazolo[b]pyridazine was obtained from the free base in 67% yield in the form of colorless microcrystals, M.P. 158–160° C. (corr.) when recrystallized from aqueous ethanol.

EXAMPLE 7

6-methyl-8-[2-(4 - chlorophenyl)-4-diethylaminobutylamino]-s-triazolo[b]pyridazine was prepared from 8.4 g. of 6-methyl-8-chloro-s-triazolo[b]pyridazine and 25.5 g. of 2-(4-chlorophenyl)-4-diethylaminobutylamine in 15 cc. of phenol according to the manipulative procedure described above in Example 1, part (c). The crude free base after one crystallization from petroleum ether (Skellysolve C), was converted to the oxalate salt in ethyl acetate solution. The resulting crystalline material was recrystallized from alcohol containing a small amount of water, giving 9.9 g. (67%) of 6-methyl-8-[2-(4-chlorophenyl)-4-diethylaminobutylamino[-s-triazolo[b]pyridazine oxalate in the form of fine colorless needles, M.P. 199.5–201° C. (corr.).

*Analysis.*—Calcd. for $C_{20}H_{27}ClN_6 \cdot C_2H_2O_4$: C, 55.40; H, 6.12; N (basic), 5.87. Found: C, 55.62; H, 7.62; N (basic), 5.80. Calcd.: Base, 81.12; acid, 18.88. Found: Base, 80.93; acid, 18.90.

A portion of the oxalate salt was converted to the free base by neutralization in aqueous medium and recrystallization of the product from petroleum ether (Skellysolve C), giving 6-methyl-8-[2-(4-chlorophenyl)-4-diethylaminobutylamino]-s-triazolo[b]pyridazine in the form of yellowish microcrystals, M.P. 137–138° C. (corr.).

*Analysis.*—Calcd. for $C_{20}H_{27}ClN_6$: C, 62.08; H, 7.04; N, 21.72. Found: C, 61.90; H, 7.60; N, 21.78.

EXAMPLE 8

(a) 6,7-dimethyl-8-hydroxy-s-triazolo[b]pyridazine was prepared from 4-amino-1,2,4-triazole and ethyl α-methylacetoacetate according to the manipulative procedure described above in Example 1, part (a). There was thus obtained a 75% yield of 6,7-dimethyl-8-hydroxy-s-triazolo[b]pyridazine in the form of colorless needles, M.P. 263.5–266.5° C. (corr.), when recrystallized from aqueous ethanol.

*Analysis.*—Calcd. for $C_7H_8N_4O$: C, 51.21; H, 4.91; N, 34.13. Found: C, 51.20; H, 5.09; N, 34.29.

(b) 6,7-dimethyl-8-chloro-s-triazolo[b]pyridazine was prepared by reacting 6,7-dimethyl-8-hydroxy-s-triazolo[b]pyridazine and phosphorus oxychloride according to the manipulative procedure described above in Example 1, part (b). There was thus obtained an 86% yield of 6,7-dimethyl-8-chloro-s-triazolo[b]pyridazine as pale yellow needles, M.P. 147–149° C., when recrystallized from 90% ethanol. This product was sublimed at 130° C. at $6 \times 10^{-4}$ mm., and then recrystallized from ethanol; M.P. 153.5–154° C.

*Analysis.*—Calcd. for $C_7H_7ClN_4$: C, 46.03; H, 3.86; N, 30.68. Found: C, 45.87; H, 4.21; N, 30.82.

(c) 6,7-dimethyl-8-(2 - diethylaminoethylamino)-s-triazolo[b]pyridazine was prepared in 67.5% yield by reacting 6,7-dimethyl-8-chloro-s-triazolo[b]pyridazine and 2-diethylaminoethylamine according to the manipulative procedure described above in Example 1, part (c). The free base was obtained in the form of cream-colored blades, M.P. 96.5–98° C., when recrystallized from cyclohexane.

*Analysis.*—Calcd. for $C_{13}H_{22}N_6$: C, 59.51; H, 8.45; N (basic), 10.68. Found: C, 59.57; H, 8.71; N (basic), 10.60.

The oxalate salt of 6,7-dimethyl-8-(2-diethylaminoethylamino)-s-triazolo[b]pyridazine was obtained from the free base in 79% yield in the form of colorless needles, M.P. 212–215° C. (corr.), when recrystallized from aqueous ethanol.

EXAMPLE 9

6,7-dimethyl-8-(4 - diethylamino-1-methylbutylamino)-s-triazolo[b]pyridazine was prepared in 50.5% yield by reacting 6,7-dimethyl-8-chloro-s-triazolo[b]pyridazine and 4-diethylamino-1-methylbutylamine according to the manipulative procedure described above in Example 1, part (c). The free base was obtained in the form of colorless blades, M.P. 97–98.5° C., when recrystallized from cyclohexane.

*Analysis.*—Calcd. for $C_{16}H_{28}N_6$: C, 63.12; H, 9.27; N (basic), 9.20. Found: C, 63.60; H, 9.35; N (basic), 9.51.

The methiodide salt of 6,7-dimethyl-8-(4-diethylamino-1-methylbutylamino) - s - triazolo[b]pyridazine was obtained from the free base in 63% yield in the form of colorless rhombs, M.P. 195.5–199.5° C. (corr.), when recrystallized from a methanol-ether mixture.

*Analysis.*—Calcd. for $C_{17}H_{31}IN_6$: I, 28.43; N, 18.83. Found: I, 28.30; N, 18.76.

EXAMPLE 10

(a) 6-methyl-7-heptyl-8-hydroxy - s - triazolo[b]pyridazine was prepared in 33% yield by reacting 4-amino-1,2,4-triazole and ethyl α-heptylacetoacetate according to the manipulative procedure described above in Example 1, part (a). The 6-methyl-7-heptyl-8-hydroxy-s-triazolo[b]pyridazine was obtained in the form of colorless blades, M.P. 170–171° C. (corr.), when crystallized from ethanol.

*Analysis.*—Calcd. for $C_{13}H_{20}N_4O$: C, 62.88; H, 8.12; N, 22.56. Found: C, 63.01; H, 8.31; N, 22.62.

(b) 6-methyl-7-heptyl-8-chloro - s - triazolo[b]pyridazine can be prepared by reacting 6-methyl-7-heptyl-8-hydroxy-s-triazolo[b]pyridazine and phosphorus oxychloride according to the manipulative procedure described above in Example 1, part (b).

(c) 6-methyl-7-heptyl-8-(2-dimethylaminoethylamino)-s-triazolo[b]pyridazine can be obtained by reacting 6-methyl-7-heptyl-8-chloro-s-triazolo[b]pyridazine and 2-dimethylaminoethylamine according to the manipulative procedure described above in Example 1, part (c).

EXAMPLE 11

(a) 6-(4-chlorophenyl)-8-hydroxy-s-triazolo[b]pyridazine.—A mixture of 253 g. of ethyl p-chlorobenzoylacetate and 84 g. of 4-amino-1,2,4-triazole was refluxed at 140–150° C. for four hours, during which period 40 cc. of ethanol was collected by distillation. After cooling somewhat, water was added to the reaction mixture and the solid material was collected by filtration. The latter was triturated with water and with cold ethanol and recrystallized from 5 liters of acetic acid, using activated charcoal for decolorizing purposes, giving 63 g. of 6-(4-chlorophenyl)-8-hydroxy - s - triazolo[b]pyridazine, M.P. above 320° C.

*Analysis.*—Calcd. for $C_{11}H_7ClN_4O$: C, 53.56; H, 2.86; Cl, 14.37; N, 22.72. Found: C, 53.81; H, 2.68; Cl, 14.66; N, 22.67.

(b) 6-(4-chlorophenyl)-8-chloro - s - triazolo[b]pyridazine was prepared in 77% yield by reacting 6-(4-chlorophenyl)-8-hydroxy-s-triazolo[b]pyridazine and phosphorus oxychloride according to the manipulative procedure described above in Example 1, part (b). The 6-(4-chlorophenyl)-8-chloro-s-triazolo[b]pyridazine was obtained in the form of brick-red needles, M.P. 240.5–241.5° C. (corr.), when recrystallized from aqueous dioxane.

*Analysis.*—Calcd. for $C_{11}H_6Cl_2N_4$: C, 49.83; H, 2.28; N, 21.14. Found: C, 49.63; H, 2.27; N, 20.99.

(c) 6-(4-chlorophenyl)- 8 -(3-diethylamino-2-hydroxypropylamino)-s-triazolo[b]pyridazine was prepared in 41% yield by reacting 6-(4-chlorophenyl)-8-chloro-s-triazolo[b]pyridazine and 3-diethylamino-2-hydroxypropylamine according to the manipulative procedure described above in Example 1, part (c). The free base was obtained in the form of colorless prismatic needles, M.P.

191.5–192.5° C. (corr.), when recrystallized from butanol.

*Analysis.*—Calcd. for $C_{18}H_{23}ClN_6O$: C, 57.67; H, 6.18; N, 22.43. Found: C, 57.65; H, 5.89; N, 22.60.

By replacement of the ethyl p-chlorobenzoylacetate in part (a) of Example 11 by a molar equivalent amount of ethyl benzoylacetate, ethyl p-toluylacetate, ethyl m-methoxybenzoylacetate, ethyl 3,4-dimethoxybenzylacetate, ethyl 3-bromo-4-methoxybenzoylacetate, or ethyl 3,4,5-trimethoxybenzoylacetate, and carrying out the manipulative procedures described in parts (a), (b) and (c) of Example 11, there can be obtained, respectively, 6-phenyl-8-(3 - diethylamino - 2 - hydroxypropylamino)-s-triazolo[b]pyridazine, 6-(4-methylphenyl)-8-(3-diethylamino-2-hydroxypropylamine)-s-triazolo[b]pyridazine, 6-(3-methoxyphenyl)-8-(3-diethylamino-2-hydroxypropylamino)-s-triazolo[b]pyridazine, 6-(3,4-dimethoxyphenyl)-8-(3-diethylamino-2-hydroxypropylamino) - s - triazolo[b]pyridazine, 6-(3-bromo-4-methoxyphenyl)-8-(3-diethylamino-2-hydroxypropylamino)-s-triazolo[b]pyridazine, or 6-(3,4,5 - trimethoxyphenyl)-8-(3-diethylamino-2-hydroxypropylamino)-s-triazolo[b]pyridazine.

EXAMPLE 12

6 - (4 - chlorophenyl) - 8 - (4 - diethylamino-1-methylbutylamino)-s-triazolo[b]pyridazine was prepared in 39% yield by reacting 6-(4-chlorophenyl)-8-chloro-s-triazolo[b]pyridazine and 4-diethylamino-1-methylbutylamine according to the manipulative procedure described above in Example 1, part (c). The free base was obtained in the form of colorless microcrystals, M.P. 125.5–126.5° C. (corr.), when recrystallized from ether.

*Analysis.*—Calcd. for $C_{20}H_{27}ClN_6$: C, 62.08; H, 7.04; N, 21.72. Found: C, 61.89; H, 6.99; N, 21.70.

This application is a continuation-in-part of my co-pending application, Serial No. 592,751, filed June 21, 1956, now abandoned.

I claim:

1. A compound having the formula

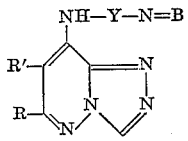

wherein R is a member of the group consisting of lower-alkyl and monocarbocyclic aryl, R' is a member of the group consisting of hydrogen and lower-alkyl, Y is a member of the group consisting of lower-alkylene, hydroxy lower-alkylene and monocarbocyclic aryl lower-alkylene, in which the free valences are on different carbon atoms, and N=B is a member of the group consisting of di-lower-alkylamino, 1-pyrrolidyl, 1-piperidyl, and 4-morpholinyl; said monocarbocyclic aryl in each instance being a member of the group consisting of phenyl and phenyl substituted by from one to three groups selected from lower-alkyl, lower-alkoxy and halogen.

2. A compound having the formula

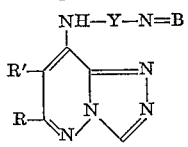

wherein R is lower-alkyl, R' is hydrogen, Y is lower-alkylene in which the free valences are on different carbon atoms, and N=B is di-lower-alkylamino.

3. A compound having the formula

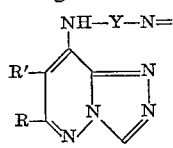

wherein R is lower-alkyl, R' is lower-alkyl, Y is lower-alkylene in which the free valences are on different carbon atoms, and N=B is di-lower-alkylamino.

4. A compound having the formula

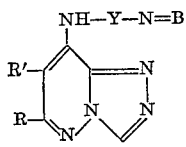

wherein R is lower-alkyl, R' is hydrogen, Y is hydroxy-lower-alkylene in which the free valences are on different carbon atoms, and N=B is di-lower-alkylamino.

5. A compound having the formula

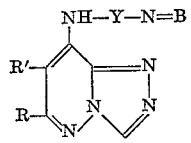

wherein R is phenyl, R' is hydrogen, Y is hydroxy-lower-alkylene in which the free valences are on different carbon atoms, and N=B is di-lower-alkylamino.

6. A compound having the formula

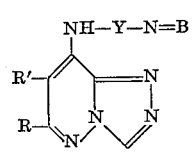

wherein R is lower-alkyl, R' is hydrogen, Y is phenyl-lower-alkylene in which the free valences are on different carbon atoms, and N=B is di-lower-alkylamino.

7. 6 - methyl - 8 - (3 - diethylaminopropylamino) - s-triazolo[b]pyridazine.

8. 6,7 - dimethyl - 8 - (2 - diethylaminoethylamino)-s-triazolo[b]pyridazine.

9. 6 - methyl - 8 - (3 - diethylamino - 2 - hydroxypropylamino)-s-triazolo[b]pyridazine.

10. 6 - (4 - chlorophenyl) - 8 - (3 - diethylamino - 2-hydroxypropylamino)-s-triazolo[b]pyridazine.

11. 6 - methyl - 8 [2 - (4 - chlorophenyl) - 4 - diethylaminobutylamino]-s-triazolo[b]pyridazine.

12. A compound selected from the group consisting of

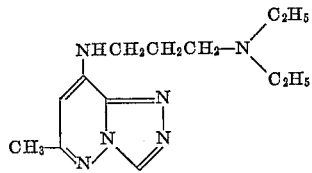

and

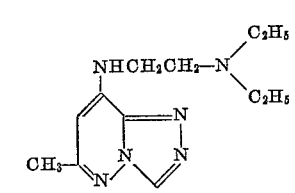

References Cited in the file of this patent

UNITED STATES PATENTS

| | | |
|---|---|---|
| 2,483,434 | Rieveschl | Oct. 4, 1949 |
| 2,700,040 | Ullyot | Jan. 18, 1955 |
| 2,940,974 | Surrey | June 14, 1960 |

OTHER REFERENCES

Takahayshi, J. Pharm. Soc., Japan, vol. 26 (1956), pages 765–7.

Burger (Editor), Medicinal Chemistry (second edition, 1960), pages 592–600.